United States Patent
Zou et al.

(10) Patent No.: US 8,785,339 B2
(45) Date of Patent: *Jul. 22, 2014

(54) OPTICAL GLASS

(71) Applicant: Hoya Corporation, Tokyo (JP)

(72) Inventors: Xuelu Zou, Tokyo (JP); Yoshio Nojima, Tokyo (JP); Hiroki Takazawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/909,122

(22) Filed: Jun. 4, 2013

(65) Prior Publication Data

US 2013/0270493 A1    Oct. 17, 2013

Related U.S. Application Data

(62) Division of application No. 12/865,594, filed as application No. PCT/JP2009/051400 on Jan. 22, 2009, now Pat. No. 8,476,178.

(30) Foreign Application Priority Data

Jan. 31, 2008    (JP) ................................ 2008-020724

(51) Int. Cl.
*C03C 3/062*    (2006.01)
*C03C 3/097*    (2006.01)

(52) U.S. Cl.
CPC ............... *C03C 3/062* (2013.01); *C03C 3/097* (2013.01)
USPC ................. 501/73; 501/63; 501/77; 501/78; 501/79

(58) Field of Classification Search
CPC ................................ C03C 3/062; C03C 3/097
USPC .................... 501/63, 73, 77, 78, 79
See application file for complete search history.

(56) References Cited

U.S. PATENT DOCUMENTS 4,526,874 A * 7/1985 Grabowski geb. Marszalek et al. ............................. 501/77
4,734,389 A * 3/1988 Grabowski et al. ............. 501/73
6,828,265 B2 12/2004 Uehara
7,351,675 B2 4/2008 Kasuga et al.
7,491,667 B2 2/2009 Hayashi
8,030,233 B2 * 10/2011 Uehara .......................... 501/73
8,476,178 B2 * 7/2013 Zou et al. ....................... 501/73
2003/0191008 A1 10/2003 Uehara
2005/0026768 A1 * 2/2005 Shimizu et al. ................. 501/73
2007/0225148 A1 9/2007 Hayashi et al.
2008/0254966 A1 * 10/2008 Tomoe et al. ................... 501/73
2009/0197755 A1 * 8/2009 Uehara .......................... 501/63
2009/0314033 A1 12/2009 Zou et al.

FOREIGN PATENT DOCUMENTS

| EP | 1 350 770 A1 | 10/2003 |
| JP | 1-148726 | 6/1989 |
| JP | 2002-087841 | 3/2002 |
| JP | 2004-161598 | 6/2004 |
| JP | 2007-284335 | 11/2007 |
| WO | WO 2004/110942 | 12/2004 |
| WO | WO 2007/114172 A1 | 10/2007 |

OTHER PUBLICATIONS

International Search Report for PCT/JP2009/051400, mailed Apr. 28, 2009.
Written Opinion for PCT/JP2009/051400, mailed Apr. 28, 2009.
Extended European Search Report in EP 09 07 6597 dated Jan. 7, 2014.

* cited by examiner

*Primary Examiner* — Kaj K Olsen
*Assistant Examiner* — Elizabeth A Bolden
(74) *Attorney, Agent, or Firm* — Nixon & Vanderhye P.C.

(57) ABSTRACT

An optical glass comprising, by mass %,
12 to 40% of $SiO_2$,
15% or more but less than 42% of $Nb_2O_5$,
2% or more but less than 18% of $TiO_2$,
(provided that $Nb_2O_5/TiO_2$ is over 0.6),
0.1 to 20% of $Li_2O$,
0.1 to 15% of $Na_2O$, and
0.1 to 25% of $K_2O$,
and having an Abbe's number vd of 20 to 30, a $\Delta Pg,F$ of 0.016 or less and a liquidus temperature of 1,200° C. or lower.

13 Claims, No Drawings

OPTICAL GLASS

This application is a divisional of application Ser. No. 12/865,594 filed Aug. 20, 2010 which in turn is the U.S. national phase of International Application No. PCT/JP2009/051400 filed 22 Jan. 2009 which designated the U.S. and claims priority to JP Patent Application No. 2008-020724 filed 31 Jan. 2008, the entire contents of each of which are hereby incorporated by reference.

TECHNICAL FIELD

This invention relates to an optical glass in a broad sense, and more specifically, it relates to an optical glass having a high dispersion property and being suitable for correction of chromatic aberration, to a press-molding glass material and an optical element formed of the above glass each and processes for producing them, and to a process for producing an optical element blank.

BACKGROUND ART

The correction of chromatic aberration requires a lens formed of a high-dispersion glass together with a lens formed of a low-dispersion glass. When aspherical lenses are employed as such lenses, a higher-performance and compact optical system can be realized.

Mass-producing of such lenses requires a glass having a low glass transition temperature, and a phosphate glass is available as a typical example thereof. In addition, a few silica-containing glasses have been also proposed as disclosed in JP 2004-161598A, Re-published WO2004/110942 and JP 2002-87841A.

SUMMARY OF THE INVENTION

Problems to be Solved by the Invention

For high-order achromatism in an image-sensing optical system or projection optical system, it is effective to use a lens formed of a low-dispersion glass and a lens formed of a high-dispersion glass in combination. Since, however, many glasses on the low-dispersion side have large partial dispersion ratios, it is more effective for high-order correction of chromatic aberration to combine a lens formed of such a glass with a lens formed of a glass that not only has a high dispersion property but also has a small partial dispersion ratio. High-dispersion phosphate glasses that are mainstream glasses for precision press-molding have large partial dispersion ratios, and it is difficult to make a phosphate glass suitable for the above object.

On the other hand, the silica-containing glasses disclosed in JP 2004-161598A and Re-published WO2004/110942 have low glass stability, and they are unsuitable for mass-production since a crystal is precipitated during stirring for obtaining a homogeneous molten glass or since a crystal is precipitated during the casting of a molten glass to shape a glass.

Further, the silica-containing glass disclosed in JP 2002-87841A has a large partial dispersion ratio, and it requires an improvement for use as an achromatic material of high order.

It is an object of this invention to provide an optical glass that overcomes the above problems and also has a high dispersion property and that is suitable for achromatism of high order and has excellent glass stability, a press-molding glass material formed of the above glass, an optical element formed of the above glass, and process for producing an optical element blank and an optical element.

Means to Solve the Problems

This invention provides, as means for overcoming the above problems, (1) an optical glass comprising, by mass %,
12 to 40% of $SiO_2$,
15% or more but less than 42% of $Nb_2O_5$,
2% or more but less than 18% of $TiO_2$,
(provided that $Nb_2O_5/TiO_2$ is over 0.6),
0.1 to 20% of $Li_2O$,
0.1 to 15% of $Na_2O$, and
0.1 to 25% of $K_2O$,
the optical glass having an Abbe's number vd of 20 to 30, a $\Delta Pg,F$ of 0.016 or less and a liquidus temperature of 1,200° C. or lower, (2) an optical glass as recited in the above (1), which contains, as optional components,
0 to 10% of $B_2O_3$,
0 to 20% of $ZrO_2$,
0 to 22% of $WO_3$,
0 to 17% of CaO,
0 to 13% of SrO,
0 to 20% of BaO,
(provided that the total content of CaO, SrO and BaO is 0 to 25%),
0 to 13% of ZnO,
0 to 3% of $La_2O_3$,
0 to 3% of $Gd_2O_3$,
0 to 3% of $Y_2O_3$,
0 to 3% of $Yb_2O_3$,
0 to 10% of $Ta_2O_5$,
0 to 3% of $GeO_2$,
0 to 10% of $Bi_2O_3$, and
0 to 10% of $Al_2O_3$,
the total content of $Nb_2O_5$ and $TiO_2$ being 35 to 65%, the total content of $Li_2O$, $Na_2O$ and $K_2O$ being 1 to 30%,
the optical glass having a refractive index nd of 1.82 or more but less than 1.87, (3) an optical glass as recited in the above (1), which contains, as optional components,
0 to 10% of $B_2O_3$,
0 to 20% of $ZrO_2$,
0 to 20% of $WO_3$,
0 to 13% of CaO,
0 to 13% of SrO,
0 to 20% of BaO,
(provided that the total content of CaO, SrO and BaO is 0 to 25%),
0 to 13% of ZnO,
0 to 3% of $La_2O_3$,
0 to 3% of $Gd_2O_3$,
0 to 3% of $Y_2O_3$,
0 to 3% of $Yb_2O_3$,
0 to 10% of $Ta_2O_5$,
0 to 3% of $GeO_2$,
0 to 10% of $Bi_2O_3$, and
0 to 10% of $Al_2O_3$,
the total content of $Nb_2O_5$ and $TiO_2$ being 35 to 60%, the total content of $K_2O$ being 0.1 to 15%, the total content of $Li_2O$, $Na_2O$ and $K_2O$ being 1 to 25%, the optical glass having a refractive index nd of 1.87 to 1.90, (4) an optical glass as recited in any one of the above (1) to (3), which contains $Sb_2O_3$ in an amount of 0 to 2% and $SnO_2$ in an amount of 0 to 2%, these amounts being based on a glass composition excluding $Sb_2O_3$ and $SnO_2$, (5) an optical glass as recited in any one of the above (1) to (4), which has a partial dispersion ratio, Pg,F, of 0.580 to 0.620, (6) an optical glass as recited in any one of the above (1) to (5), which has a glass transition temperature of less than 600° C., (7) a press-molding glass material formed of the optical glass recited in any one of the above (1) to (6), (8) an optical element formed of the optical glass recited in any one of the above (1) to (6), (9) a process for producing an optical element blank, which comprises softening the glass material recited in the above (7) under heat and press-molding the glass material,

(10) a process for producing an optical element blank, which comprises supplying a molten glass to a press mold and press-molding the molten glass, wherein glass raw materials prepared so as to obtain the optical glass recited in any one of the above (1) to (6) are melted under heat and the resultant molten glass is press-molded,

(11) a process for producing an optical element, which comprises grinding and polishing the optical element blank produced by the process recited in the above (9) or (10),

(12) a process for producing an optical element, which comprises heating the press-molding glass material recited in the above (7) and precision press-molding it with a press mold,

(13) a process for producing an optical element as recited in the above (12), which comprises introducing the glass material into the press mold and heating said mold and the glass material together, and

(14) a process for producing an optical element as recited in the above (12), which comprises heating the glass material and introducing the glass material to a pre-heated press mold to carry out the precision press-molding.

Effect of the Invention

According to this invention, there can be provided an optical glass that has a high dispersion property and is suitable for achromatism of high order and that has excellent glass stability, a press-molding glass material formed of the above glass and an optical element formed of the above glass. Further, there can be provided a process for producing an optical element blank formed of the above glass and a process for producing an optical element.

PREFERRED EMBODIMENTS OF THE INVENTION

Optical Glass

First, the optical glass of this invention will be explained.

In general, a high-dispersion glass exhibits positive anomalous dispersion. When the partial dispersion property of the high-dispersion glass can be brought close to a normal line in a partial dispersion ratio Pg,f-Abbe's number vd diagram while maintaining the high dispersion property and keeping the partial dispersion ratio Pg,F small, there can be provided an optical glass material that is highly effective for high-order correction of chromatic aberration when combined with a lens formed of a low-dispersion glass.

For making such a glass material real, the present inventors have employed, as a base, a silica-containing composition advantageous for brining the partial dispersion property close to the normal line, and for imparting high-refractivity high-dispersion properties, they have introduced $Nb_2O_5$ and $TiO_2$ as essential components.

On the basis of finding that the present inventors have acquired, $Nb_2O_5$ works much better to inhibit the partial dispersion ratio than $TiO_2$. It is hence decided that the partial dispersion ratio is to be controlled by adjusting the ratio of $Nb_2O_5$ and $TiO_2$.

When the moldability during the reheating and softening of a glass is taken into account, alkali metal components are introduced for imparting the glass with the property of being softened at a low temperature, while it has been found that the glass stability is sharply decreased when any one of $Li_2O$, $Na_2O$ and $K_2O$ weighs too much in the introduction of the alkali metal components. The present inventors have therefore succeeded in remarkable improvement of the glass stability on the basis of a mixed alkali effect produced by making $Li_2O$, $Na_2O$ and $K_2O$ co-present as glass components.

On the basis of the above findings, the components have been optimized and this invention has been completed.

That is, the optical glass of this invention comprises, by mass %, 12 to 40% of $SiO_2$,
15% or more but less than 42% of $Nb_2O_5$,
2% or more but less than 18% of $TiO_2$,
(provided that $Nb_2O_5/TiO_2$ is over 0.6),
0.1 to 20% of $Li_2O$,
0.1 to 15% of $Na_2O$, and
0.1 to 25% of $K_2O$,
the optical glass having an Abbe's number vd of 20 to 30, a partial dispersion ratio of 0.580 to 0.620, a $\Delta Pg,F$ of 0.016 or less and a liquidus temperature of 1,200° C. or lower.

The optical glass of this invention exhibits a high refractive index, for example, of 1.82 to 1.90, and an optical element formed of this glass is effective for downsizing an optical system.

The above partial dispersion ratio Pg,F is expressed as (ng−nF)/(nF−nc) in which ng, nF and nc are refractive indices to g-ray, F-ray and c-ray.

When a partial dispersion ratio on a normal line that is the standard of a normal partial dispersion glass in the partial dispersion ratio Pg,f-Abbe's number vd diagram is expressed as $Pg,F^{(0)}$, $Pg,F^{(0)}$ can be expressed by the following equation using an Abbe's number vd.

$$Pg,F^{(0)} = 0.6483 - (0.0018 \times vd)$$

$\Delta Pg,F$ is a deviation of a partial dispersion ratio from the above normal line and is expressed by the following equation.

$$\Delta P_{g,F} = P_{g,F} - P_{g,F}^{(0)}$$
$$= P_{g,F} + (0.0018 \times vd) - 0.6483$$

In the present specification, a content by % and a total content by % stand for a content by mass % and a total content by mass % unless otherwise specified, and a content ratio also means a mass ratio.

The optical glass of this invention is largely classified into the following two embodiments.

The first embodiment is an optical glass containing, as optional components, 0 to 10% of $B_2O_3$,
0 to 20% of $ZrO_2$,
0 to 22% of $WO_3$,
0 to 17% of CaO, 0 to 13% of SrO,
0 to 20% of BaO,
(provided that the total content of CaO, SrO and BaO is 0 to 25%),
0 to 13% of ZnO,
0 to 3% of $La_2O_3$,
0 to 3% of $Gd_2O_3$,
0 to 3% of $Y_2O_3$,
0 to 3% of $Yb_2O_3$,
0 to 10% of $Ta_2O_5$,
0 to 3% of $GeO_2$,
0 to 10% of $Bi_2O_3$, and
0 to 10% of $Al_2O_3$,
the total content of $Nb_2O_5$ and $TiO_2$ being 35 to 65%, the total content of $Li_2O$, $Na_2O$ and $K_2O$ being 1 to 30%,
the optical glass having a refractive index nd of 1.82 or more but less than 1.87.

The second embodiment is an optical glass having a higher refractive index than the first embodiment and contains, as optional components,
0 to 10% of $B_2O_3$,
0 to 20% of $ZrO_2$,
0 to 20% of $WO_3$,
0 to 13% of CaO,
0 to 13% of SrO,
0 to 20% of BaO,
(provided that the total content of CaO, SrO and BaO is 0 to 25%),
0 to 13% of ZnO,
0 to 3% of $La_2O_3$,
0 to 3% of $Gd_2O_3$,
0 to 3% of $Y_2O_3$,
0 to 3% of $Yb_2O_3$,
0 to 10% of $Ta_2O_5$,
0 to 3% of $GeO_2$,
0 to 10% of $Bi_2O_3$,
0 to 10% of $Al_2O_3$,
the total content of $Nb_2O_5$ and $TiO_2$ being 35 to 60%, the total content of $K_2O$ being 0.1 to 15%, the total content of $Li_2O$, $Na_2O$ and $K_2O$ being 1 to 25%, the optical glass having a refractive index nd of 1.87 to 1.90.

In the optical glasses according to the first and second embodiments, $Sb_2O_3$ and $SnO_2$ can be added in an amount of 0 to 2% each based on a glass composition excluding $Sb_2O_3$ and $SnO_2$.

Functions of the above components and reasons for limitations of compositional ranges thereof will be explained.

$SiO_2$ is a glass network-forming oxide and is an essential component for maintaining the stability of a glass and the shapeability of a molten glass. When the content thereof is less than 12%, the glass stability is decreased and the chemical durability is degraded. Further, the viscosity of the glass during the formation of a molten glass becomes too low, and the shapeability is decreased. When the content thereof exceeds 40%, the liquidus temperature and the glass transition temperature increase, and the devitrification resistance and the meltability are also degraded. Further, it is difficult to realize a desired Abbe's number vd. The content of $SiO_2$ is therefore adjusted to 12 to 40%. The content of $SiO_2$ is preferably in the range of 15 to 35%, more preferably in the range of 18 to 33%, still more preferably in the range of 20 to 30%, yet more preferably in the range of 22 to 28%.

$Nb_2O_5$ is an essential component that works to increase the refractive index and improve the devitrification resistance by decreasing the liquidus temperature. It is also a component that works to bring the partial dispersion property close to the normal line among high-refractivity-imparting components, that is, a component that works to bring ΔPg,F close to zero. When the content thereof is less than 15%, there is caused a problem that it is difficult to maintain the desired refractive index, etc., and it is difficult to bring the partial dispersion property close to the normal line. When the content thereof is 42% or more, the liquidus temperature increases, and the devitrification resistance is degraded. The content of $Nb_2O_5$ is therefore adjusted to 15% or more but less than 42%. The lower limit of content of $Nb_2O_5$ is preferably 18%, more preferably 20%, still more preferably 22%, yet more preferably 25%, and the upper limit thereof is preferably 41.5%, more preferably 41%.

$TiO_2$ is an essential component effective for increasing the refractive index and improving the devitrification resistance and chemical durability. When the content thereof is less than 2%, the above effects are not produced. When it is 18% or more, it is difficult to realize the desired Abbe's number vd. The content of $TiO_2$ is therefore adjusted to 2% or more but less than 18%. Preferably, the content of $TiO_2$ is in the range of 3% or more but less than 16% for the optical glass according to the first embodiment or in the range of 2% or more but less than 12% for the optical glass according to the second embodiment. More preferably, it is in the range of 4% or more but less than 14% for the optical glass according to the first embodiment or in the range of 3% or more but less than 12% for the optical glass according to the second embodiment. Still more preferably, it is in the range of 5% or more but less than 12% for the optical glass according to the first embodiment or in the range of 4% or more but less than 12% for the optical glass according to the second embodiment. Yet more preferably, it is it is in the range of 6% or more but less than 12% for the optical glass according to the first embodiment or in the range of 5% or more but less than 12% for the optical glass according to the second embodiment. In the optical glass according to the second embodiment, further more preferably, it is in the range of 6% or more but less than 12%.

For controlling ΔPg,F, the ratio of the content of $Nb_2O_5$ to the content of $TiO_2$, $Nb_2O_5/TiO_2$, plays an important role. When the above ratio is 0.6 or less, the partial dispersion ratio and ΔPg,F increase, and the chromatic correction effect of high order decreases. Therefore, the ratio of the content of $Nb_2O_5$ to the content of $TiO_2$, $Nb_2O_5/TiO_2$ is adjusted to over 0.6. The above ratio $Nb_2O_5/TiO_2$ is preferably in the range of 0.70 or more, more preferably in the range of 0.80 or more, still more preferably in the range of 0.90 or more, yet more preferably in the range of 1.0 or more.

$Li_2O$ works to improve the meltability and decrease the glass transition temperature. Of the alkali metal components, $Li_2O$ works much better to decrease the glass transition temperature in particular, and it is also a component that can relatively maintain a high refractive index. Further, thanks to the mixed alkali effect produced by the co-presence thereof with $Na_2O$ and $K_2O$, the glass stability is improved. When the content of $Li_2O$ is less than 0.1%, the above effects cannot be obtained. When it exceeds 20%, the liquidus temperature increases and the devitrification resistance decreases. The content of $Li_2O$ is therefore adjusted to 0.1 to 20%. The content of $Li_2O$ is preferably in the range of 0.1 to 17, more preferably in the range of 0.1 to 15%. In the optical glass according to the first embodiment, the content of $Li_2O$ is still more preferably in the range of 1 to 10%, yet more preferably in the range of 1 to 5%. In the second embodiment, it is still more preferably in the range of 1 to 12%, yet more preferably in the range of 1 to 10%.

$Na_2O$ works to improve the meltability and decrease the glass transition temperature. Further, it works to remarkably improve the glass stability together with $Li_2O$ thanks to the mixed alkali effect. When the content of $Na_2O$ is less than 0.1%, the above effects cannot be produced. When it exceeds 15%, the liquidus temperature increases, and the devitrification resistance decreases. The content of $Na_2O$ is therefore adjusted to 0.1 to 15%. The content of $Na_2O$ is preferably in the range of 0.1 to 12%, more preferably in the range of 0.5 to 10%.

In the optical glass according to the first embodiment, the content of $Na_2O$ is still more preferably in the range of 0.5 to 9%, yet more preferably in the range of 0.5 to 8%. In the optical glass according to the second embodiment, the content of $Na_2O$ is still more preferably in the range of 0.5 to 7%, yet more preferably in the range of 0.5 to 5%.

$K_2O$ also works to improve the meltability and decrease the glass transition temperature. It also works to remarkably improve the glass stability together with $Li_2O$ and $Na_2O$ thanks to the mixed alkali effect. When the content of $K_2O$ is less than 0.1%, the above effects cannot be produced. When the content of $K_2O$ exceeds 25%, the liquidus temperature increases, and the devitrification resistance decreases. The content of $K_2O$ is therefore adjusted to 0.1 to 25%.

In the optical glass according to the first embodiment, the content of $K_2O$ is preferably in the range of 0.1 to 22%, more preferably in the range of 0.5 to 20%, still more preferably in the range of 0.5 to 17%, yet more preferably in the range of 0.5 to 15%.

In the optical glass according to the second embodiment, the content of $K_2O$ is preferably in the range of 0.1 to 15%, more preferably in the range of 0.1 to 12%, still more preferably in the range of 0.5 to 10%, yet more preferably in the range of 0.5 to 7%, further more preferably in the range of 0.5 to 5%.

The Abbe's number vd of the optical glass of this invention (including the optical glasses according to the first and second embodiments) is 20 to 30. For further improving the devitrification resistance and realizing the desired partial dispersion property, the Abbe's number vd is preferably in the range of 21 to 29, more preferably in the range of 22 to 29.

The optical glass of this invention has $\Delta Pg,F$ of 0.016 or less. For making it easier to improve the various properties above, $\Delta Pg,F$ is preferably 0.015 or less, more preferably 0.014 or less, still more preferably 0.013 or less, yet more preferably 0.012 or less. The lower limit of $\Delta Pg,F$ is not specially limited, while it is generally 0 or more, and for making it easier to improve the various properties above, it is preferably 0.001 or more, more preferably 0.002 or more, still more preferably 0.005 or more, yet more preferably 0.007 or more.

For making it easier to improve the various properties above, preferably, the partial dispersion ratio Pg,F is adjusted to 0.580 to 0.620. Pg,F is more preferably in the range of 0.585 to 0.620, still more preferably in the range of 0.590 to 0.619, yet more preferably in the range of 0.595 to 0.618, further more preferably in the range of 0.600 to 0.618.

The optical glass of this invention has a liquidus temperature of 1,200° C. or lower and is excellent in stability. The liquidus temperature is preferably in the range of 1,180° C. or lower, more preferably 1,160° C. or lower.

Optional components will be explained below.

$B_2O_3$ is an oxide for forming a glass network and works to improve the meltability and decrease the liquidus temperature, and moreover, it is a component effective for realizing a low dispersion property. However, when it is introduced in an amount exceeding 10%, the refractive index is decreased, and the chemical durability is degraded. The content of $B_2O_3$ is therefore adjusted to 0 to 10%. The content of $B_2O_3$ is preferably in the range of 0 to 8%, more preferably in the range of 0 to 7%, still more preferably in the range of 0 to 6%, yet more preferably in the range of 0 to 5%.

$ZrO_2$ works to increase the refractive index and improve the chemical durability. However, when the content thereof exceeds 20%, the devitrification resistance is decreased, and the glass transition temperature is increased. The content of $ZrO_2$ is therefore adjusted to 0 to 20%. The content of $ZrO_2$ is preferably in the range of 0 to 16%, more preferably in the range of 0 to 14%, still more preferably in the range of 0 to 12%, yet more preferably in the range of 0 to 10%.

$WO_3$ works to increase the refractive index nd, decrease the liquidus temperature and improve the devitrification resistance. However, when the content thereof in the optical glass according to the first embodiment exceeds 22%, or when the content thereof in the optical glass according to the second embodiment exceeds 20%, the liquidus temperature is increased and the devitrification resistance is decreased. Further, the coloring the glass is intensified. The content of $WO_3$ in the optical glass according to the first embodiment is adjusted to 0 to 22%, and the content of $WO_3$ in the optical glass according to the second embodiment is adjusted to 0 to 20%. The content of $WO_3$ in the optical glass according to the first embodiment is preferably in the range of 0 to 20%, more preferably in the range of 0 to 17%, still more preferably in the range of 1 to 15%, yet more preferably in the range of 1 to 12%. The content of $WO_3$ in the optical glass according to the second embodiment is preferably in the range of 0 to 17%, more preferably in the range of 0 to 15%, still more preferably in the range of 1 to 12%, yet more preferably in the range of 1 to 10%.

CaO works to improve the meltability and increase the light transmittance. Further, when it is introduced into the glass in the form of a carbonate material or nitrate material, a defoaming effect can be also produced. However, when the content thereof in the optical glass according to the first embodiment exceeds 17%, or when the content thereof in the optical glass according to the second embodiment exceeds 13%, the liquidus temperature is increased, and the devitrification resistance is increased. Further, the refractive index is also decreased. Therefore, the content of CaO in the optical glass according to the first embodiment is adjusted to 0 to 17% and the content of CaO in the optical glass according to the second embodiment is adjusted to 0 to 13%. The content of CaO in the first embodiment is preferably in the range of 0 to 15%, more preferably in the range of 0 to 12%, still more preferably in the range of 0 to 10%, yet more preferably in the range of 0 to 8%. The content of CaO in the second embodiment is preferably in the range of 0 to 12%, more preferably in the range of 0 to 10%, still more preferably in the range of 0 to 7%, yet more preferably in the range of 0 to 5%.

SrO also works to improve the meltability and increase the light transmittance. Further, when it is introduced into the glass in the form of a carbonate material or a nitrate material, a defoaming effect can be also produced. However, when the content thereof exceeds 13%, the liquidus temperature is increased, and the devitrification resistance is decreased. Further, the refractive index is decreased. The content of SrO is therefore adjusted to 0 to 13%. The content of SrO is preferably in the range of 0 to 12%, more preferably in the range of 0 to 10%, still more preferably in the range of 0 to 7%, yet more preferably in the range of 0 to 5%.

BaO also works to improve the meltability and increase the light transmittance. Further, when it is introduced into the glass in the form of a carbonate material or a nitrate material, a defoaming effect can be also produced. However, when the content thereof exceeds 20%, the liquidus temperature is increased, and the devitrification resistance is decreased. Further, the refractive index is decreased. The content of BaO is therefore adjusted to 0 to 20%. The content of BaO is preferably in the range of 0 to 17%, and in the optical glass according to the first embodiment, it is more preferably in the range of 0 to 15%, still more preferably in the range of 0 to 12%, yet more preferably in the range of 0 to 10%. In the optical glass according to the second embodiment, the content of BaO is more preferably in the range of 1 to 15%, still more preferably in the range of 2 to 12%, yet more preferably in the range of 3 to 10%.

For preventing the liquidus temperature from increasing and for improving the devitrification resistance, desirably, the total content of CaO, SrO and BaO is adjusted to 0 to 25%. The total content of CaO, SrO and BaO is more preferably in the range of 1 to 22%, still more preferably in the range of 2 to 20%, yet more preferably in the range of 3 to 17%, further more preferably in the range of 5 to 15%.

ZnO also works to improve the meltability and increase the light transmittance. Further, when it is introduced into the glass in the form of a carbonate material or a nitrate material, a defoaming effect can be also produced. However, when the content thereof exceeds 13%, the liquidus temperature is increased, and the devitrification resistance is decreased. Further, the refractive index is decreased. The content of ZnO is therefore adjusted to 0 to 13%. The content of ZnO is preferably in the range of 0 to 12%, more preferably in the range of 0 to 10%, still more preferably in the range of 0 to 7%, yet more preferably in the range of 0 to 5%.

$La_2O_3$, $Gd_2O_3$, $Y_2O_3$ and $Yb_2O_3$ work to increase the refractive index and chemical durability. However, when any one of these is introduced in an amount exceeding 3%, the liquidus temperature is increased, and the devitrification resistance is decreased. The content of each of $La_2O_3$, $Gd_2O_3$, $Y_2O_3$ and $Yb_2O_3$ is therefore adjusted to 0 to 3%. The content of each of $La_2O_3$, $Gd_2O_3$, $Y_2O_3$ and $Yb_2O_3$ is preferably in the range of 0 to 2%, more preferably in the range of 0 to 1%. Still more preferably, none of $La_2O_3$, $Gd_2O_3$, $Y_2O_3$ and $Yb_2O_3$ is introduced.

$Ta_2O_5$ also works to increase the refractive index and improve the chemical durability. However, when it is introduced in an amount exceeding 10%, the liquidus temperature is increased, and the devitrification resistance is decreased. The content of $Ta_2O_5$ is therefore adjusted to 0 to 10%. The content of $Ta_2O_5$ is preferably in the range of 0 to 7%, more preferably in the range of 0 to 5%.

$GeO_2$ is a network-forming oxide, and also works to increase the refractive index. Since, however, it is an expensive component, the content of $GeO_2$ is adjusted to 0 to 3%, more preferably, to 0 to 2%. Still more preferably, no $GeO_2$ is introduced.

$Bi_2O_3$ works not only to increase the refractive index but also to improve the glass stability. However, when it is introduced in an amount exceeding 10%, the coloring of the glass is intensified. The content of $Bi_2O_3$ is therefore adjusted to 0 to 10%, more preferably, to 0 to 5%. The content of $Bi_2O_3$ in the optical glass according to the first embodiment is still more preferably in the range of 0 to 4%, and the content of $Bi_2O_3$ in the optical glass according to the second embodiment is still more preferably in the range of 0 to 3%.

$Al_2O_3$ works to improve the glass stability and chemical durability when introduced in a small amount. However, when it is introduced in an amount exceeding 10%, the liquidus temperature is increased, and the devitrification resistance is decreased. The content of $Al_2O_3$ is therefore adjusted to 0 to 10%, more preferably, to 0 to 5%, still more preferably, to 0 to 3%.

In the optical glass according to the first embodiment, the total content of $Nb_2O_5$ and $TiO_2$ is adjusted to 35 to 65%, preferably, to 38 to 62%, more preferably, to 40 to 62%, still more preferably, to 43 to 60%, yet more preferably, to 45 to 58%.

In the optical glass according to the second embodiment, the total content of $Nb_2O_5$ and $TiO_2$ is adjusted to 30 to 60%, preferably, to 33 to 59%, more preferably, to 35 to 58%, still more preferably, to 38 to 57%, yet more preferably, to 40 to 55%.

In any one of the optical glasses according to the first and second embodiments, when the total content of $Nb_2O_5$ and $TiO_2$ is too small, it is difficult to realize the predetermined optical properties. When the above total content is too large, the liquidus temperature increases, and the devitrification resistance decreases.

In the optical glass according to the first embodiment, the total content of $Li_2O$, $Na_2O$ and $K_2O$ is adjusted to 1 to 30%, preferably, to 2 to 27%, more preferably, to 3 to 25%, still more preferably, to 4 to 22%, yet more preferably, to 5 to 20%.

In the optical glass according to the second embodiment, the total content of $Li_2O$, $Na_2O$ and $K_2O$ is adjusted to 1 to 25%, preferably, to 2 to 22%, more preferably, to 3 to 20%, still more preferably, to 4 to 18%, yet more preferably, to 5 to 15%.

In any one of the optical glasses according to the first and second embodiments, when the total content of $Li_2O$, $Na_2O$ and $K_2O$ is too small, the glass transition temperature increases, and the meltability decreases. When the above total content is too large, the liquidus temperature increases, and the devitrification resistance decreases.

The optical glass according to the first embodiment has a high refractive index nd of 1.82 or more but less than 1.87, preferably 1.82 to 1.865, more preferably 1.82 to 1.860, while this refractive index is relatively low for the optical glass of this invention.

On the other hand, the optical glass according to the second embodiment has a refractive index nd of 1.87 to 1.90, preferably 1.87 to 1.895, more preferably 1.87 to 1.89, or it corresponds to a glass having a relatively high refractive index for the optical glass of this invention.

The glass of this invention is not required to contain components such as Lu and Hf. Since both Lu and Hf are also expensive components, it is preferred to limit the content of each of $Lu_2O_3$ and $HfO_2$ to 0 to 1%, and it is more preferred to limit the content of each to 0 to 0.5%. It is particularly preferred to introduce none of $Lu_2O_3$ and $HfO_2$.

In view of detrimental effects on the environment, it is also preferred to introduce none of As, Pb, U, Th, Te and Cd.

Further, for taking advantage of the excellent optical transmittance of the glass, it is preferred to introduce none of substances that cause coloring, such as Cu, Cr, V, Fe, Ni, Co, etc.

In the optical glass of this invention, $Sb_2O_3$ and $SnO_2$ can be added in an amount of 0 to 2% each based on a glass composition excluding $Sb_2O_3$ and $SnO_2$. These additives work as a refiner, and besides this, $Sb_2O_3$ can inhibit the coloring of the glass caused by inclusion of impurities such as Fe, etc. The amount of each of $Sb_2O_3$ and $SnO_2$ based on a glass composition excluding these is preferably 0 to 1%, more preferably 0 to 0.5%.

The glass transition temperature of the glass of this invention is preferably less than 600° C., more preferably 590° C. or lower, still more preferably 580° C. or lower. Having the above low glass transition temperature, the optical glass of this invention is not only suitable for precision press-molding, but also excellent in moldability during its molding by reheating and softening of the glass. Since the glass transition temperature is low as described above, the heating temperature during molding can be as well kept relatively low. Therefore, a chemical reaction between the glass and a mold such as a press mold, or the like does not easily take place, so that glass shaped materials having clean and smooth surfaces can be shaped. Further, the deterioration of the mold can be suppressed.

The above optical glass can be obtained by weighing and formulating oxides, carbonates, sulfate, nitrates, hydroxides, etc., as raw materials so as to obtain an intended glass composition, fully mixing the formulated raw materials to prepare a batch mixture, melting the batch mixture under heat in a melting vessel, carrying out defoaming and stirring to prepare a homogeneous and bubbles-free molten glass, and shaping the molten glass. Specifically, it can be produced by employing a known melting method.

[Press-Molding Glass Material]

The press-molding glass material of this invention will be explained below.

The press-molding glass material of this invention is characteristically formed of the above optical glass of this invention.

The above glass material means a glass lump to be press-molded. Examples of the glass material include glass lumps having masses equivalent to the masses of press-molded products, such as a precision press-molding preform, a press-molding glass gob of an optical element blank.

The above examples of the glass material will be explained below.

The precision press-molding preform (to be sometimes simply referred to as "preform" hereinafter) means a preshaped glass material that is to be precision press-molded by heating. The above precision press-molding is also called optics molding as is well known, and is a method in which the optical-function surface of an optical element is formed by transferring the form of molding surface of a press mold. The optical-function surface refers to a surface that refracts, reflects or diffracts light to be controlled or allows light to be controlled to enter or go out in an optical element, and a lens surface of a lens correspond to the optical-function surface.

For preventing a reaction and fusing between a glass and the molding surface of a press mold and at the same time ensuring that the glass excellently extends along the molding surface, preferably, the preform is surface-coated with a release film. The type of the release film includes, noble metal (platinum, platinum alloy),
oxides (oxides of Si, Al, Zr, La, Y),
nitrides (nitrides of B, Si, Al), and
carbon-containing film.

The carbon-containing film is preferably a film containing carbon as a main component (a film in which the carbon content is larger than the content of any other element when element contents in the film are expressed by atomic %). Specifically, a carbon film, a hydrocarbon film, etc., can be given as examples. The method for forming a carbon-containing film can be selected from known methods using a carbon material, such as a vacuum vapor deposition method, a sputtering method, an ion plating method, etc., and known methods of thermal decomposition, etc., using a material gas such as hydrocarbon. The other films can be formed by employing a vapor deposition method, a sputtering method, an ion plating method, a sol-gel method, etc.

The production of the preform is carried out as follows.

The first production example refers to a method in which a molten glass lump having a predetermined weight is separated from a molten glass and cooled to shape a preform having a mass equivalent to that of the molten glass lump. For example, glass raw materials are melted, refined and homogenized to prepare a homogeneous molten glass, and the molten glass is caused to flow out of a temperature-adjusted flow nozzle or flow pipe made of platinum or platinum alloy. When a preform of a small size or a spherical preform is shaped, molten glass is caused to drop as a molten glass drop having a desired mass from the flow nozzle, and it is received with a preform shaping mold and shaped into a preform. Alternatively, a molten glass drop having a desired mass is caused to drop from the flow nozzle into liquid nitrogen, etc., to shape a preform. When a preform of an intermediate or large size is produced, molten glass flow is caused to flow downward from the flow pipe, the forward end of the molten glass flow is received with a preform shaping mold, a narrow portion is formed in the molten glass flow between the nozzle and the preform shaping mold, then, the preform shaping mold is sharply moved vertically downward to separate the molten glass flow in the narrow portion, and a separated molten glass lump having a desired mass is received with a receiving member and shaped into a preform.

For producing a preform having a smooth surface free of scratches, soiling, creases, an altered surface, etc., for example, a preform having a free surface, there is employed a method in which a molten glass lump is shaped into a preform while it is caused to float above a preform shaping mold by applying a gas pressure to it, or a method in which molten glass drops are introduced into a medium that is a liquid prepared by cooling a substance that is a gas at room temperature under atmospheric pressure, such as liquid nitrogen.

When a molten glass lump is shaped into a preform while it is caused to float, a gas (to be referred to as "floating gas") is blown to the molten glass lump to exert a gas pressure thereon upwardly. In this case, when the viscosity of the molten glass lump is too low, floating gas enters the glass and remains in the glass in the form of bubbles. However, when the viscosity of the molten glass lump is adjusted to 3 to 60 dPa·s, the glass lump can be caused to float without the entering of any floating gas into the glass.

The gas used for applying the floating gas to a preform includes air, $N_2$ gas, $O_2$ gas, Ar gas, He gas, water vapor, etc. The gas pressure is not specially limited so long as the preform can be caused to float without contacting the shaping mold surface, etc.

Since many precision press-molded products (e.g., an optical element) produced from preforms have axes of rotational symmetry, preforms desirably have forms having axes of rotational symmetry. Specific examples of the forms thereof include the form of a sphere and a form having one axis of rotation symmetry. The form having one axis of rotational symmetry includes forms each having a smooth outline free of a corner or a dent in a cross section including the above axis of rotational symmetry, such as a form having an outline that is an ellipse whose minor axis corresponds to the axis or rotational symmetry in the above cross section, and a form obtained by flattening a sphere (a form shaped by determining one axis passing the center of a sphere and shrinking the sphere in the direction of the above axis).

The second production example of the preform refers to a method in which a homogeneous molten glass is cast into a mold, then, a shaped material is annealed to remove a strain and cut or split to predetermined dimensions or form, a plurality of glass pieces are thereby produced, and the glass pieces are polished to smoothen their surfaces and form preforms having a predetermined mass each. The thus-produced preforms are preferably used after a carbon-containing film is coated on the surface of each.

A press-molding glass gob of an optical element blank as a glass material refers to a glass lump that is used when an optical element blank to be completed into an optical element by grinding and polishing is press-molded. The optical element blank has a form obtained by adding a processing margin to be removed by grinding and polishing to the form of an optical element.

The production example of the above glass gob refers to a method in which a homogeneous molten glass is cast into a mold, then, a shaped material is annealed to remove a strain and cut or split to predetermined dimensions and form to prepare a plurality of glass pieces, and each glass piece is barrel-polished to round edges of each glass piece so that the mass of the glass gob is adjusted so as to be equivalent to the mass of an optical element blank. The gob after the barrel polishing has a roughened surface, which is a surface to which a release agent in the form of a powder for press-molding can be easily applied.

In the second glass gob production example, the forward end of a molten glass that is flowing out is received with a gob-shaping mold, a narrow portion is formed in the middle of the molten glass flow, and the gob-shaping mold is rapidly moved vertically downward to separate a molten glass in the narrow portion by means of a surface tension. In this manner, a molten glass lump having a desired mass is obtained, and the glass lump is shaped while a gas pressure is applied to the glass upwardly by ejecting a gas to the glass. The thus-obtained glass lump is annealed and then barrel-polished to obtain a glass gob having a desired mass.

[Optical Element]

The optical element of this invention will be explained below. The optical element of this invention is characteristically formed of the above optical glass of this invention. Specifically, examples thereof include an aspherical lens, a spherical lens, or lenses such as a plano-concave lens, a plano-convex lens, a biconcave lens, a biconvex lens, a convex meniscus lens, a concave meniscus lens, etc., a microlens, a lens array, a lens with a diffraction grating, a prism, a prism with a lens function, etc. The surface of the optical element may be provided with an anti-reflection film, a partial reflecting film having selectivity to a wavelength, etc.

Since the optical element of this invention is formed of the glass having a high-dispersion property but having a small partial dispersion ratio, it can perform chromatic correction of high order when combined with an optical element formed of other glass. Further, since the optical element of this invention is formed of the glass having a high refractive index, an image-sensing optical system and a projector optical system can be downsized when it is used in such optical systems.

[Process for Producing Optical Element Blank]

The process for producing an optical element blank, provided by this invention, will be explained below.

The first process for the production of an optical element blank refers to a process of softening the above press-molding glass material of this invention under heat and press-molding it. As described above, a mold release agent in the form of a powder such as boron nitride is uniformly applied to the surface of the glass material, the glass material is placed on a refractory vessel, introduced into a heating furnace and heated until the glass is softened, and then it is introduced into a press mold and press-molded. Then, a press-molded product is taken out of the mold, and annealed to remove a strain and adjust optical properties such as a refractive index, etc., such that they have desired values.

The second process for the production of an optical element blank refers to a method of supplying a molten glass to a press mold to shape it into an optical element blank, in which glass raw materials prepared for obtaining the above optical glass of this invention are melted under heat and a molten glass by the melting is press-molded. First, a homogenized molten glass is caused to flow onto a lower mold member shaping surface having a powder mold release agent such as boron nitride, etc., uniformly applied thereon, and the molten glass flow whose lower end portion is supported with the lower mold member is cut with cutting blades called shears. In this manner, a molten glass lump having a desired mass is obtained on the molding surface of the lower mold member. Then, the lower mold member with the molten glass lump on it is carried to a place vertically right below an upper mold member standing by in other position, and the molten glass lump is pressed with the upper mold member and the lower mold member to shape it in the form of an optical element blank. Then, press-shaped product is taken out of the mold and annealed to remove a strain and adjust optical properties such as a refractive index, etc., such that they have desired values.

The above two production processes can be both carried out in atmosphere. Further, with regard to shaping conditions, a material quality of the press mold, a furnace for softening under heat and a vessel on which to place a glass gob for softening under heat, known conditions and known tools, etc., can be employed.

[Process for Producing Optical Element]

The process for the production of an optical element, provided by this invention, will be explained below.

The first process for the production of an optical element, provided by this invention, comprises grinding and polishing an optical element blank produced by the above process of this invention. For grinding and polishing, known methods can be employed.

The second process for the production of an optical element, provided by this invention, comprises heating the above press-molding glass material of this invention and precision press-molding it with a press mold. The above glass material refers to a preform.

The step of heating the press mold and the preform and pressing is preferably carried out in a non-oxidizing gas atmosphere such as an atmosphere containing nitrogen gas or a gas mixture of nitrogen gas with hydrogen gas, for preventing the oxidation of molding surface of the press mold or a release film provided on the above molding surface. In the non-oxidizing gas atmosphere, a carbon-containing film coating the preform surface is not oxidized and remains on the surface of a molded product obtained by the precision press-molding. This film is to be finally removed, and for relatively easily and completely removing the carbon-containing film, the precision press-molded product can be heated in an oxidizing atmosphere, e.g., in the atmosphere. The removal of the carbon-containing film by oxidation is required to be carried out at a temperature at which the precision press-molded product is not deformed under heat. Specifically, it is preferably carried out in a temperature range below the glass transition temperature.

The precision press-molding uses a press mold having molding surfaces that are beforehand highly accurately processed to have a desired form each, and a release film may be formed on the molding surface for preventing the fusion of a glass during pressing. The release film includes a carbon-containing film, a nitride film and a precious metal film, and as a carbon-containing film, a hydrogenated carbon film, a carbon film, etc., are preferred. In the precision press-molding, a preform is fed between a pair of an upper mold member and a lower mold member whose molding surfaces are accurately processed in form and which face each other, then, both the mold and the preform are heated to a temperature corresponding to a glass viscosity of $10^5$ to $10^9$ dPa·s to soften the preform, and the preform is press-molded, whereby the form of molding surfaces of the mold can be precisely transferred to the glass.

Alternatively, a preform that is temperature-increased beforehand to a temperature corresponding to a glass viscosity of $10^4$ to $10^8$ dPa·s is fed between a pair of an upper mold member and a lower mold member having molding surfaces accurately processed in form and facing each other, and the preform is press-molded, whereby the form of molding surfaces of the mold can be precisely transferred to the glass.

The pressure and time period for the pressing can be determined as required by taking account of the viscosity of a glass, etc., and for example, the pressure can be set at approximately 5 to 15 MPa and the pressing time period can be set for 10 to 30 seconds. The press conditions such as a time period for the pressing and the pressure can be determined as required in well-known ranges depending upon the form and dimensions of a molded product.

Thereafter, the mold and the precision press-molded product are cooled, and preferably, when the temperature thereof reaches a strain point or lower, the precision press-molded product is separated from the mold and taken out. In addition, for precisely adjusting optical properties to desired values, conditions for annealing the molded product, such as an annealing speed, etc., during cooling can be adjusted as required.

The above second process for the production of an optical element can be largely classified into the following two methods. The first process refers to an optical element production process in which the glass material is introduced into a press mold and the mold and the glass material are heated together, and this process is recommendable when importance is attached to improvements in molding accuracy such as surface accuracy, eccentricity accuracy, etc. The second process refers to an optical element production process in which the glass material is heated, introduced into a pre-heated press mold and press-molded, and this process is recommendable when importance is attached to improvements in productivity.

In addition, the optical element of this invention can be also produced without carrying out a press-molding step. For example, the optical element can be obtained by casting a homogeneous molten glass into a mold to form a glass block, annealing it to remove a strain and adjust optical properties by adjusting annealing conditions such that the refractive index of the glass becomes a desired value, then, cutting or splitting the glass block to prepare a glass piece and further grinding and polishing it to complete the optical element.

EXAMPLES

This invention will be more specifically explained with reference to Examples hereinafter, while this invention shall not be limited by these Examples.

Example 1

Oxides, carbonates, sulfates, nitrates, hydroxides, etc., corresponding to raw materials for introducing components so as to obtain a glass composition shown in Table 1 or 2 were employed, the raw materials were weighed and fully mixed to prepare a formulated raw material, and it was placed in a platinum crucible and melted under heat. After the melting, a molten glass was cast into a mold, and gradually cooled to a temperature around its glass transition temperature. Then, the glass was placed in an annealing furnace, annealed in a glass transition temperature range for approximately 1 hour and then allowed to cool in the furnace to room temperature. In this manner, optical glasses Nos. 1 to 17 were obtained. The glass Nos. 1 to 11 in Table 1 are glasses according to the first embodiment, and the glass Nos. 12 to 17 are glasses according to the second embodiment.

In the thus-obtained optical glasses, no crystal observable through a microscope precipitated.

Table 3 shows various properties of the thus-obtained optical glasses.

The optical glasses were measured for properties by the following methods.

(1) Refractive Indices nd, ng, nF and nc and Abbe's Number vd

A glass obtained by decreasing temperature at a temperature decrease rate of −30° C./hour was measured for refractive indices nd, ng, nF and nc and an Abbe's number vd according to the refractive index measurement method of Japan Optical Glass Industrial Society Standard.

(2) Liquidus Temperature LT

A glass was placed in a furnace that was set under heat at a predetermined temperature for 2 hours, and cooled, and then, the glass was internally observed through an optical microscope of 100 magnifications. A liquidus temperature was determined on the basis of whether or not a crystal existed.

(3) Glass Transition Temperature Tg

Measured with a differential scanning calorimeter (DSC) at a temperature elevation rate of 10° C./minute.

(4) Partial Dispersion Ratio Pg,F

Calculated from refractive indices ng, nF and nc.

(5) Deviation ΔPg,F of Partial Dispersion Ratio from Normal Line

Calculated from a partial dispersion ratio Pg,F$^{(0)}$ on a normal line, which ratio was calculated from a partial dispersion ratio Pg,F and an Abbe's number vd.

TABLE 1

| | | Glass No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| SiO2 | mass % | 24.63 | 24.92 | 25.36 | 25.82 | 23.64 | 22.84 | 23.43 | 23.88 | 23.19 | 22.95 | 21.87 |
| | mol % | 39.73 | 40.00 | 40.27 | 40.55 | 40.00 | 40.00 | 39.74 | 40.00 | 40.28 | 40.00 | 37.00 |
| Nb2O5 | mass % | 37.58 | 38.00 | 38.70 | 39.39 | 37.85 | 36.58 | 37.52 | 38.25 | 37.14 | 36.77 | 37.63 |
| | mol % | 13.70 | 13.79 | 13.89 | 13.98 | 14.47 | 14.48 | 14.38 | 14.47 | 14.58 | 14.47 | 14.38 |
| TiO2 | mass % | 9.03 | 9.14 | 9.30 | 9.47 | 9.75 | 9.42 | 10.74 | 10.95 | 8.50 | 9.47 | 10.77 |
| | mol % | 10.96 | 11.03 | 11.11 | 11.19 | 12.41 | 12.41 | 13.70 | 13.79 | 11.11 | 12.41 | 13.70 |
| Li2O | mass % | 4.22 | 4.27 | 4.35 | 4.43 | 2.03 | 0.39 | 1.81 | 2.25 | 1.99 | 1.77 | 2.22 |
| | mol % | 13.70 | 13.79 | 13.89 | 13.99 | 6.90 | 1.38 | 6.16 | 7.59 | 6.94 | 6.21 | 7.53 |
| Na2O | mass % | 3.50 | 3.99 | 4.51 | 5.05 | 4.62 | 4.47 | 4.58 | 4.67 | 4.54 | 4.49 | 4.60 |
| | mol % | 5.48 | 6.21 | 6.94 | 7.69 | 7.59 | 7.59 | 7.53 | 7.59 | 7.64 | 7.59 | 7.53 |

TABLE 1-continued

| | | Glass No. | | | | | | | | | | |
|---|---|---|---|---|---|---|---|---|---|---|---|
| | | 1 | 2 | 3 | 4 | 5 | 6 | 7 | 8 | 9 | 10 | 11 |
| K2O | mass % | 2.66 | 2.69 | 2.74 | 2.79 | 7.03 | 11.73 | 6.97 | 6.45 | 6.89 | 6.82 | 5.72 |
| | mol % | 2.74 | 2.76 | 2.78 | 2.80 | 7.59 | 13.10 | 7.53 | 6.90 | 7.64 | 7.59 | 6.16 |
| B2O3 | mass % | 0.98 | 1.00 | 1.01 | 1.03 | 0.94 | 0.91 | 0.94 | 0.95 | 0.93 | 0.92 | 0.94 |
| | mol % | 1.37 | 1.38 | 1.39 | 1.40 | 1.38 | 1.38 | 1.37 | 1.38 | 1.39 | 1.38 | 1.37 |
| ZrO2 | mass % | 5.22 | 5.29 | 5.38 | 5.48 | 5.01 | 4.84 | 4.97 | 3.38 | 4.92 | 4.87 | 4.98 |
| | mol % | 4.11 | 4.14 | 4.17 | 4.20 | 4.14 | 4.14 | 4.11 | 2.76 | 4.17 | 4.14 | 4.11 |
| WO3 | mass % | 1.64 | 3.32 | 3.37 | 3.44 | 6.29 | 6.08 | 6.23 | 6.35 | 6.17 | 6.11 | 6.25 |
| | mol % | 0.68 | 1.38 | 1.39 | 1.40 | 2.76 | 2.76 | 2.74 | 2.76 | 2.78 | 2.76 | 2.74 |
| MgO | mass % | 0.00 | 0.00 | 0.00 | 0.00 | 0.00 | 0.00 | 0.00 | 0.00 | 0.00 | 0.00 | 0.00 |
| | mol % | 0.00 | 0.00 | 0.00 | 0.00 | 0.00 | 0.00 | 0.00 | 0.00 | 0.00 | 0.00 | 0.00 |
| CaO | mass % | 0.79 | 0.80 | 0.82 | 0.83 | 0.76 | 0.73 | 0.75 | 0.77 | 0.75 | 0.74 | 0.76 |
| | mol % | 1.37 | 1.38 | 1.39 | 1.40 | 1.38 | 1.38 | 1.37 | 1.38 | 1.39 | 1.38 | 1.37 |
| SrO | mass % | 0.00 | 0.00 | 0.00 | 0.00 | 0.00 | 0.00 | 0.00 | 0.00 | 0.00 | 0.00 | 0.00 |
| | mol % | 0.00 | 0.00 | 0.00 | 0.00 | 0.00 | 0.00 | 0.00 | 0.00 | 0.00 | 0.00 | 0.00 |
| BaO | mass % | 9.75 | 6.58 | 4.46 | 2.27 | 2.08 | 2.01 | 2.06 | 2.10 | 2.04 | 2.02 | 2.07 |
| | mol % | 6.16 | 4.14 | 2.78 | 1.40 | 1.38 | 1.38 | 1.37 | 1.38 | 1.39 | 1.38 | 1.37 |
| ZnO | mass % | 0.00 | 0.00 | 0.00 | 0.00 | 0.00 | 0.00 | 0.00 | 0.00 | 0.00 | 0.00 | 2.19 |
| | mol % | 0.00 | 0.00 | 0.00 | 0.00 | 0.00 | 0.00 | 0.00 | 0.00 | 0.00 | 0.00 | 2.74 |
| La2O3 | mass % | 0.00 | 0.00 | 0.00 | 0.00 | 0.00 | 0.00 | 0.00 | 0.00 | 0.00 | 0.00 | 0.00 |
| | mol % | 0.00 | 0.00 | 0.00 | 0.00 | 0.00 | 0.00 | 0.00 | 0.00 | 0.00 | 0.00 | 0.00 |
| Gd2O3 | mass % | 0.00 | 0.00 | 0.00 | 0.00 | 0.00 | 0.00 | 0.00 | 0.00 | 0.00 | 0.00 | 0.00 |
| | mol % | 0.00 | 0.00 | 0.00 | 0.00 | 0.00 | 0.00 | 0.00 | 0.00 | 0.00 | 0.00 | 0.00 |
| Y2O3 | mass % | 0.00 | 0.00 | 0.00 | 0.00 | 0.00 | 0.00 | 0.00 | 0.00 | 0.00 | 0.00 | 0.00 |
| | mol % | 0.00 | 0.00 | 0.00 | 0.00 | 0.00 | 0.00 | 0.00 | 0.00 | 0.00 | 0.00 | 0.00 |
| Ta2O5 | mass % | 0.00 | 0.00 | 0.00 | 0.00 | 0.00 | 0.00 | 0.00 | 0.00 | 2.94 | 3.07 | 0.00 |
| | mol % | 0.00 | 0.00 | 0.00 | 0.00 | 0.00 | 0.00 | 0.00 | 0.00 | 0.69 | 0.69 | 0.00 |
| Al2O3 | mass % | 0.00 | 0.00 | 0.00 | 0.00 | 0.00 | 0.00 | 0.00 | 0.00 | 0.00 | 0.00 | 0.00 |
| | mol % | 0.00 | 0.00 | 0.00 | 0.00 | 0.00 | 0.00 | 0.00 | 0.00 | 0.00 | 0.00 | 0.00 |
| Total | mass % | 100.00 | 100.00 | 100.00 | 100.00 | 100.00 | 100.00 | 100.00 | 100.00 | 100.00 | 100.00 | 100.00 |
| | mol % | 100.00 | 100.00 | 100.00 | 100.00 | 100.00 | 100.00 | 100.00 | 100.00 | 100.00 | 100.00 | 100.00 |
| R2O | mass % | 10.38 | 10.95 | 11.60 | 12.27 | 13.68 | 16.59 | 13.36 | 13.37 | 13.42 | 13.08 | 12.54 |
| | mol % | 21.92 | 22.76 | 23.61 | 24.48 | 22.08 | 22.07 | 21.22 | 22.08 | 22.22 | 21.39 | 21.22 |
| RO | mass % | 10.54 | 7.38 | 5.28 | 3.10 | 2.84 | 2.74 | 2.81 | 2.87 | 2.79 | 2.76 | 2.83 |
| | mol % | 7.53 | 5.52 | 4.17 | 2.80 | 2.76 | 2.76 | 2.74 | 2.76 | 2.78 | 2.76 | 2.74 |
| Nb2O5 + TiO2 | mass % | 46.61 | 47.14 | 48.00 | 48.86 | 47.60 | 46.00 | 48.26 | 49.20 | 45.64 | 46.24 | 48.40 |
| | mol % | 24.66 | 24.82 | 25.00 | 25.17 | 26.88 | 26.89 | 28.26 | 28.26 | 25.69 | 26.88 | 28.08 |
| Nb2O5/ TiO2 | mass % | 4.16 | 4.16 | 4.16 | 4.16 | 3.88 | 3.88 | 3.49 | 3.49 | 4.37 | 3.88 | 3.49 |
| | mol % | 1.25 | 1.25 | 1.25 | 1.25 | 1.17 | 1.17 | 1.05 | 1.05 | 1.31 | 1.17 | 1.05 |

(Note 1)
Nb$_2$O$_5$ + TiO$_2$ stands for a total content of Nb$_2$O$_5$ and TiO$_2$.
(Note 2)
Nb$_2$O$_5$/TiO$_2$ stands for a value obtained by dividing the content of Nb$_2$O$_5$ by the content of TiO$_2$.
(Note 3)
R$_2$O stands for a total content of Li$_2$O, Na$_2$O and K$_2$O.
(Note 4)
RO stands for a total content of CaO, SrO and BaO.
(Note 5)
LT stands for a liquidus temperature.
(Note 6)
Tg stands for a glass transition temperature.
(Note 7)
Glasses Nos. 1 to 11 were optical glasses according to the first embodiment.

TABLE 2

| | | Glass No. | | | | | |
|---|---|---|---|---|---|---|---|
| | | 12 | 13 | 14 | 15 | 16 | 17 |
| SiO2 | mass % | 23.85 | 21.53 | 19.73 | 20.71 | 21.75 | 19.31 |
| | mol % | 37.50 | 32.66 | 33.55 | 34.94 | 36.36 | 33.53 |
| Nb2O5 | mass % | 39.10 | 33.70 | 41.82 | 42.20 | 42.52 | 41.00 |
| | mol % | 13.90 | 11.60 | 16.08 | 16.09 | 16.08 | 16.10 |
| TiO2 | mass % | 9.40 | 16.70 | 8.70 | 8.80 | 8.91 | 8.60 |
| | mol % | 11.10 | 19.01 | 11.19 | 11.19 | 11.18 | 11.20 |
| Li2O | mass % | 5.49 | 5.58 | 2.66 | 2.68 | 2.70 | 2.60 |
| | mol % | 17.36 | 17.01 | 9.09 | 9.09 | 9.09 | 9.09 |
| Na2O | mass % | 1.37 | 1.39 | 5.51 | 5.56 | 5.61 | 5.40 |
| | mol % | 2.08 | 2.04 | 9.09 | 9.09 | 9.09 | 9.09 |
| K2O | mass % | 2.77 | 2.81 | 2.58 | 2.60 | 2.62 | 2.53 |
| | mol % | 2.78 | 2.72 | 2.80 | 2.80 | 2.80 | 2.80 |

TABLE 2-continued

|  |  | Glass No. | | | | | |
| --- | --- | --- | --- | --- | --- | --- | --- |
|  |  | 12 | 13 | 14 | 15 | 16 | 17 |
| B2O3 | mass % | 2.05 | 2.08 | 1.91 | 1.92 | 1.94 | 1.87 |
|  | mol % | 2.78 | 2.72 | 2.80 | 2.80 | 2.80 | 2.80 |
| ZrO2 | mass % | 5.44 | 5.52 | 5.06 | 3.40 | 1.72 | 4.96 |
|  | mol % | 4.17 | 4.08 | 4.20 | 2.80 | 1.40 | 4.20 |
| WO3 | mass % | 1.70 | 1.73 | 1.59 | 1.60 | 1.61 | 1.55 |
|  | mol % | 0.69 | 0.68 | 0.70 | 0.70 | 0.70 | 0.70 |
| MgO | mass % | 0.00 | 0.00 | 0.00 | 0.00 | 0.00 | 0.00 |
|  | mol % | 0.00 | 0.00 | 0.00 | 0.00 | 0.00 | 0.00 |
| CaO | mass % | 2.06 | 2.09 | 1.92 | 1.93 | 1.95 | 0.75 |
|  | mol % | 3.47 | 3.40 | 3.50 | 3.50 | 3.50 | 1.40 |
| SrO | mass % | 0.00 | 0.00 | 0.00 | 0.00 | 0.00 | 0.00 |
|  | mol % | 0.00 | 0.00 | 0.00 | 0.00 | 0.00 | 0.00 |
| BaO | mass % | 6.77 | 6.87 | 6.29 | 6.35 | 6.40 | 9.25 |
|  | mol % | 4.17 | 4.08 | 4.20 | 4.20 | 4.20 | 6.29 |
| ZnO | mass % | 0.00 | 0.00 | 2.23 | 2.25 | 2.27 | 2.18 |
|  | mol % | 0.00 | 0.00 | 2.80 | 2.80 | 2.80 | 2.80 |
| La2O3 | mass % | 0.00 | 0.00 | 0.00 | 0.00 | 0.00 | 0.00 |
|  | mol % | 0.00 | 0.00 | 0.00 | 0.00 | 0.00 | 0.00 |
| Gd2O3 | mass % | 0.00 | 0.00 | 0.00 | 0.00 | 0.00 | 0.00 |
|  | mol % | 0.00 | 0.00 | 0.00 | 0.00 | 0.00 | 0.00 |
| Y2O3 | mass % | 0.00 | 0.00 | 0.00 | 0.00 | 0.00 | 0.00 |
|  | mol % | 0.00 | 0.00 | 0.00 | 0.00 | 0.00 | 0.00 |
| Ta2O5 | mass % | 0.00 | 0.00 | 0.00 | 0.00 | 0.00 | 0.00 |
|  | mol % | 0.00 | 0.00 | 0.00 | 0.00 | 0.00 | 0.00 |
| Al2O3 | mass % | 0.00 | 0.00 | 0.00 | 0.00 | 0.00 | 0.00 |
|  | mol % | 0.00 | 0.00 | 0.00 | 0.00 | 0.00 | 0.00 |
| Total | mass % | 100.00 | 100.00 | 100.00 | 100.00 | 100.00 | 100.00 |
|  | mol % | 100.00 | 100.00 | 100.00 | 100.00 | 100.00 | 100.00 |
| R2O | mass % | 9.63 | 9.78 | 10.75 | 10.84 | 10.93 | 10.53 |
|  | mol % | 22.22 | 21.77 | 20.98 | 20.98 | 20.98 | 20.98 |
| RO | mass % | 8.83 | 8.96 | 8.21 | 8.28 | 8.35 | 10.00 |
|  | mol % | 7.64 | 7.48 | 7.70 | 7.70 | 7.70 | 7.69 |
| Nb2O5 + TiO2 | mass % | 48.50 | 50.40 | 50.52 | 51.00 | 51.43 | 49.60 |
|  | mol % | 25.00 | 30.61 | 27.27 | 27.28 | 27.26 | 27.30 |
| Nb2O5 | mass % | 4.16 | 2.02 | 4.81 | 4.80 | 4.77 | 4.77 |
| NbO2 | mass % | 1.25 | 0.61 | 1.44 | 1.44 | 1.44 | 1.44 |

(Note 1)
Nb2O5 + TiO2 stands for a total content of Nb2O5 and TiO2.
(Note 2)
Nb2O5/TiO2 stands for a value obtained by dividing the content of Nb2O5 by the content of TiO2.
(Note 3)
R2O stands for a total content of Li2O, Na2O and K2O.
(Note 4)
RO stands for a total content of CaO, SrO and BaO.
(Note 5)
LT stands for a liquidus temperature.
(Note 6)
Tg stands for a glass transition temperature.
(Note 7)
Glasses Nos. 12 to 17 were optical glasses according to the second embodiment.

TABLE 3

| Glass No. | LT (° C.) | Tg (° C.) | Specific gravity | nd | vd | nc | nF | ng | Pg, F. | ΔPg, F. |
| --- | --- | --- | --- | --- | --- | --- | --- | --- | --- | --- |
| 1 | 1150 | 567 | 3.617 | 1.85110 | 25.79 | 1.84161 | 1.87461 | 1.89478 | 0.611 | 0.0093 |
| 2 | 1100 | 556 | 3.577 | 1.85005 | 25.44 | 1.84044 | 1.87386 | 1.89432 | 0.612 | 0.0097 |
| 3 | 1090 | 554 | 3.530 | 1.84748 | 25.34 | 1.83787 | 1.87132 | 1.89184 | 0.613 | 0.0108 |
| 4 | 1090 | 550 | 3.484 | 1.84475 | 25.18 | 1.83512 | 1.86867 | 1.88918 | 0.611 | 0.0084 |
| 5 | 1130 | 561 | 3.519 | 1.84054 | 24.46 | 1.83070 | 1.86507 | 1.88625 | 0.616 | 0.0120 |
| 6 | 1130 | 577 | 3.462 | 1.81321 | 25.10 | 1.80389 | 1.83629 | 1.85622 | 0.615 | 0.0120 |
| 7 | 1130 | 562 | 3.541 | 1.84591 | 24.05 | 1.83585 | 1.87102 | 1.89267 | 0.616 | 0.0106 |
| 8 | 1130 | 554 | 3.513 | 1.84600 | 24.06 | 1.83588 | 1.87104 | 1.89271 | 0.616 | 0.0113 |
| 9 | 1130 | 563 | 3.576 | 1.83991 | 24.65 | 1.83013 | 1.86420 | 1.88515 | 0.615 | 0.0110 |
| 10 | 1130 | 560 | 3.599 | 1.84905 | 24.00 | 1.83893 | 1.87430 | 1.89625 | 0.621 | 0.0155 |
| 11 | 1120 | 548 | 3.600 | 1.86214 | 23.86 | 1.85179 | 1.88792 | 1.91022 | 0.617 | 0.0119 |
| 12 | 1160 | 547 | 3.566 | 1.86077 | 25.61 | 1.85111 | 1.88472 | 1.90526 | 0.611 | 0.0089 |
| 13 | 1170 | 546 | 3.575 | 1.89283 | 23.93 | 1.88215 | 1.91946 | 1.94257 | 0.619 | 0.0142 |
| 14 | 1170 | 549 | 3.697 | 1.88093 | 24.39 | 1.87056 | 1.90668 | 1.92890 | 0.615 | 0.0108 |
| 15 | 1160 | 542 | 3.662 | 1.87372 | 24.45 | 1.86348 | 1.89921 | 1.92117 | 0.615 | 0.0103 |

TABLE 3-continued

| Glass No. | LT (° C.) | Tg (° C.) | Specific gravity | nd | vd | nc | nF | ng | Pg, F. | ΔPg, F. |
|---|---|---|---|---|---|---|---|---|---|---|
| 16 | 1180 | 539 | 3.629 | 1.86630 | 24.52 | 1.85617 | 1.89150 | 1.91323 | 0.615 | 0.0109 |
| 17 | 1180 | 539 | 3.747 | 1.88192 | 24.44 | 1.87159 | 1.90768 | 1.92993 | 0.617 | 0.0122 |

(Note 1)
LT stands for a liquidus temperature.
(Note 2)
Tg stands for a glass transition temperature.
(Note 3)
Glasses Nos. 1 to 11 were optical glasses according to the first embodiment, and Glasses Nos. 12 to 17 were optical glasses according to the second embodiment.

Comparative Example

Glass materials prepared so as to have compositions of Examples 1 to 13 in JP2004-161598A were melted according to the method described in the same document. In Examples 1 and 2, melts devitrified during their stirring, and in Examples 4 to 13, no glass was formed. In Example 3, a glass was obtained by casting a melt into a mold, while the precipitation of a crystal was observed inside.

Example 2

Raw materials prepared so as to give the same optical glasses as those produced in Example 1 were melted, refined and homogenized to prepare molten glasses, molten glasses were respectively caused to drop from a nozzle made of platinum, and drops were received with preform-shaping molds and shaped into spherical preforms formed of the above various glasses while they were caused to float by applying gas pressure.

Further, the above molten glasses were respectively caused to flow out of a pipe made of platinum, lower ends of them were received with preform-shaping molds, narrow portions were formed in the molten glass flows, and then the preform-shaping molds were rapidly moved vertically downward to cut the molten glass flows in the narrow portions, and separated molten glass lumps were received with the preform-shaping molds and shaped into spherical preforms formed of the above various glasses while they were caused to float by applying gas pressure.

Example 3

The molten glasses prepared in Example 2 were respectively continuously cast into molds and molded into glass blocks, and then each of the glass blocks was annealed and cut to give glass pieces. These glass pieces were ground and polished to give preforms formed of the above various glasses.

Example 4

The molten glasses prepared in Example 2 were respectively continuously cast into molds and molded into glass blocks, and then each of the glass blocks was annealed and cut to give glass pieces. These glass pieces were barrel-polished to give press-molding glass gobs formed of the above various glasses.

Example 5

A carbon-containing film was coated on the surface of each of the preforms prepared in Examples 2 and 3, and each preform was respectively introduced into a press mold having molding surfaces provided with a carbon-containing release film and including upper and lower mold members and a sleeve member. The mold and each preform were heated in a nitrogen atmosphere to soften the preforms, and the preforms were precision press-molded to produce various lenses formed of the above various glasses, such as aspherical convex meniscus lenses, aspherical concave meniscus lenses, aspherical biconvex lenses and aspherical biconcave lenses.

Example 6

A powder release agent prepared from boron nitride was uniformly applied to the surface of each of the glass gobs prepared in Example 4, and the glass gobs were softened under heat in the atmosphere and press-molded with a press mold to produce blanks for various lenses such as spherical convex meniscus lenses, spherical concave meniscus lenses, spherical biconvex lenses and spherical biconcave lenses. Lens blanks formed of the above various glasses were produced in the above manner.

Example 7

Each of the molten glasses prepared in Example 2 was caused to flow out, each molten glass flow was cut with shears to separate molten glass lumps, and each lump was press-molded with a press mold, to produce various lenses formed of various glasses, such as spherical convex meniscus lenses, spherical concave meniscus lenses, spherical biconvex lenses and spherical biconcave lenses. Lens banks formed of the above various glasses were produced in the above manner.

Example 8

The lens blanks prepared in Examples 6 and 7 were annealed to remove a strain and adjust their refractive indices to desired values, and then they were ground and polished to produce various lenses formed of the above various glasses, such as spherical convex meniscus lenses, spherical concave meniscus lenses, spherical biconvex lenses and spherical biconcave lenses. Lenses formed of the above various lenses were produced in the above manner.

Example 9

The molten glasses prepared in Example 2 were caused to flow out and cast into molds to produce glass blocks, these blocks were cut, and the resultant cut pieces were ground and polished to produce various spherical lenses and prisms.

INDUSTRIAL UTILITY

The optical glass of this invention has a high dispersion property and is suitable for correcting aberration of high order, and it can be suitably used for producing press-molding glass materials such as precision press-molding preforms, etc., optical element blanks and optical elements.

The invention claimed is:

1. An optical glass comprising, by mass %,
   12 to 40% of $SiO_2$,
   15% or more but less than 42% of $Nb_2O_5$,
   2% or more but less than 12% of $TiO_2$,
   (provided that $Nb_2O_5/TiO_2$ is equal to or more than 3.49),
   0.1 to 20% of $Li_2O$,
   0.1 to 15% of $Na_2O$, and
   0.1 to 25% of $K_2O$,
   the optical glass having an Abbe's number νd of 20 to 30, a refractive index nd of 1.87 to 1.90, ΔPg,F of 0.016 or less and a liquidus temperature of 1,200° C. or lower.

2. The optical glass as recited in claim 1, which contains, as optional components,
   0 to 10% of $B_2O_3$,
   0 to 20% of $ZrO_2$,
   0 to 20% of $WO_3$,
   0 to 13% of CaO,
   0 to 13% of SrO,
   0 to 20% of BaO,
   (provided that the total content of CaO, SrO and BaO is 0 to 25%),
   0 to 13% of ZnO,
   0 to 3% of $La_2O_3$,
   0 to 3% of $Gd_2O_3$,
   0 to 3% of $Y_2O_3$,
   0 to 3% of $Yb_2O_3$,
   0 to 10% of $Ta_2O_5$,
   0 to 3% of $GeO_2$,
   0 to 10% of $Bi_2O_3$, and
   0 to 10% of $Al_2O_3$,
   the total content of $Nb_2O_5$ and $TiO_2$ being 30 to 60%, the content of $K_2O$ being 0.1 to 15%, and the total content of $Li_2O$, $Na_2O$ and $K_2O$ being 1 to 25%.

3. The optical glass as recited in claim 1, which contains $Sb_2O_3$ in an amount of 0 to 2% and $SnO_2$ in an amount of 0 to 2%, these amounts being based on a glass composition excluding $Sb_2O_3$ and $SnO_2$.

4. The optical glass as recited in claim 1, which has a partial dispersion ratio, Pg,F, of 0.580 to 0.620.

5. The optical glass as recited in claim 1, which has a glass transition temperature of less than 600° C.

6. A press-molding glass material formed of the optical glass recited in claim 1.

7. A process for producing an optical element blank, which comprises softening the glass material recited in claim 6 under heat and press-molding the glass material.

8. A process for producing an optical element, which comprises grinding and polishing the optical element blank produced by the process recited in claim 7.

9. A process for producing an optical element, which comprises heating the press-molding glass material recited in claim 6 and precision press-molding it with a press mold.

10. The process for producing an optical element as recited in claim 9, which comprises introducing the glass material into the press mold and heating said mold and the glass material together.

11. A process for producing an optical element as recited in claim 9, which comprises heating the glass material and introducing the glass material to a pre-heated press mold to carry out the precision press-molding.

12. An optical element formed of the optical glass recited in claim 1.

13. A process for producing an optical element blank, which comprises supplying a molten glass to a press mold and press-molding the molten glass,
   wherein glass raw materials prepared so as to obtain the optical glass recited in claim 1 are melted under heat and the resultant molten glass is press-molded.

* * * * *